United States Patent
Rakshit et al.

(10) Patent No.: US 12,375,778 B2
(45) Date of Patent: Jul. 29, 2025

(54) GENERATING EXPANDED CONTENT IN A VIDEO STREAM BASED ON PREDICTING VIEWER BEHAVIOR

(71) Applicant: INTERNATIONAL BUSINESS MACHINES CORPORATION, Armonk, NY (US)

(72) Inventors: Sarbajit K. Rakshit, Kolkata (IN); Sudhanshu Sekher Sar, Bangalore (IN); Satyam Jakkula, Bengaluru (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 18/468,321

(22) Filed: Sep. 15, 2023

(65) Prior Publication Data

US 2025/0097544 A1  Mar. 20, 2025

(51) Int. Cl.
*H04N 21/81* (2011.01)
*G06Q 30/0251* (2023.01)
(Continued)

(52) U.S. Cl.
CPC ....... *H04N 21/812* (2013.01); *G06Q 30/0255* (2013.01); *H04N 21/44008* (2013.01);
(Continued)

(58) Field of Classification Search
CPC ........... H04N 21/812; H04N 21/44008; H04N 21/44218; H04N 21/454; H04N 21/4665; G06Q 30/0255
See application file for complete search history.

(56) References Cited

U.S. PATENT DOCUMENTS 9,392,302 B2 * 7/2016 Kelman ........... H04N 21/23424
10,123,058 B1 * 11/2018 Sharma ........... H04N 21/23424
(Continued)

FOREIGN PATENT DOCUMENTS

| CN | 114786062 A | 7/2022 |
| KR | 20210000988 A | 1/2021 |
| WO | 2015/157714 A1 | 10/2015 |

OTHER PUBLICATIONS

"How to create a Generative video model," LeewayHertz, 22pp., [online][retrieved Sep. 4, 2023] https://leewayhertz.com/create-generative-video-model/.
(Continued)

*Primary Examiner* — Timothy R Newlin
(74) *Attorney, Agent, or Firm* — Konrad, Raynes, Davda & Victor LLP; David Victor (57) ABSTRACT

Provided are a computer program product, system, and method for generating expanded content in a video stream based on predicting viewer behavior. A determination is made of promoted content rendered in the video. In response to determining the promoted content, invoking at least one machine learning model to perform determining whether a viewer of the video is interested in the promoted content and generating expanded content for a duration in response to determining that the viewer of the video is interested in the promoted content. The rendering of the video is paused and the expanded content is rendered for the duration while pausing the rendering of the video. The rendering of the video is continued in response to completing the rendering of the expanded content.

20 Claims, 4 Drawing Sheets

FIG. 1

(51) Int. Cl.
  *H04N 21/44* (2011.01)
  *H04N 21/442* (2011.01)
  *H04N 21/454* (2011.01)
  *H04N 21/466* (2011.01)

(52) U.S. Cl.
  CPC ..... *H04N 21/44218* (2013.01); *H04N 21/454* (2013.01); *H04N 21/4665* (2013.01)

(56) References Cited

U.S. PATENT DOCUMENTS

| | | | | |
|---|---|---|---|---|
| 10,440,431 | B1* | 10/2019 | Bulusu | H04N 21/4532 |
| 10,491,958 | B2 | 11/2019 | Taylor et al. | |
| 11,330,323 | B2* | 5/2022 | Baxter | H04N 21/4782 |
| 2005/0137958 | A1* | 6/2005 | Huber | G06Q 30/02 |
| | | | | 705/37 |
| 2009/0066722 | A1 | 3/2009 | Kriger et al. | |
| 2010/0080529 | A1* | 4/2010 | Barton | H04N 21/8455 |
| | | | | 386/343 |
| 2010/0280876 | A1* | 11/2010 | Bowra | G06Q 30/0251 |
| | | | | 705/14.69 |
| 2011/0145857 | A1* | 6/2011 | Agarwal | H04N 21/858 |
| | | | | 725/32 |
| 2012/0072272 | A1* | 3/2012 | Kilar | G11B 27/322 |
| | | | | 705/14.4 |
| 2014/0363143 | A1* | 12/2014 | Dharssi | H04N 21/854 |
| | | | | 386/282 |
| 2015/0245103 | A1* | 8/2015 | Conte | G06Q 30/0643 |
| | | | | 725/60 |
| 2016/0066051 | A1* | 3/2016 | Caidar | H04N 21/45455 |
| | | | | 725/60 |
| 2016/0094886 | A1* | 3/2016 | Lian | H04N 21/26258 |
| | | | | 725/32 |
| 2016/0210666 | A1* | 7/2016 | Ataka | G06Q 30/0255 |
| 2017/0270965 | A1 | 9/2017 | Bao et al. | |
| 2018/0165876 | A1 | 6/2018 | Heinz, II et al. | |
| 2018/0232763 | A1* | 8/2018 | Ahuja | G06Q 30/0276 |
| 2019/0058856 | A1* | 2/2019 | Bostick | H04N 21/44218 |
| 2019/0230387 | A1* | 7/2019 | Gersten | G06F 16/783 |
| 2019/0287152 | A1* | 9/2019 | Adoni | G06Q 30/0631 |
| 2020/0045363 | A1* | 2/2020 | Nellore | H04N 21/812 |
| 2020/0092590 | A1* | 3/2020 | Carpenter | G06N 20/00 |
| 2020/0228880 | A1* | 7/2020 | Iyer | H04N 21/251 |
| 2020/0288206 | A1* | 9/2020 | Bist | H04N 21/4756 |
| 2021/0185392 | A1* | 6/2021 | Xu | H04N 21/8146 |
| 2022/0180898 | A1* | 6/2022 | Ahmed | H04N 21/84 |
| 2023/0065762 | A1* | 3/2023 | Gupta | G06F 16/489 |
| 2023/0068465 | A1* | 3/2023 | Bao | G06Q 30/0256 |
| 2024/0048811 | A1* | 2/2024 | Lam | H04N 21/8586 |
| 2024/0355050 | A1* | 10/2024 | Couleaud | G06Q 30/0241 |

OTHER PUBLICATIONS

Simone, "Interactive CTV Ads are the Secret to Higher Engagement and Longer Viewing Rates," kortx.io, 19 pp., [online][retrieved Sep. 4, 2023] https://kortx.io/news/interactive-ctv/.

International Searching Authority, "Notification of Transmittal of the International Search Report and the Written Opinion of the International Searching Authority, or Declaration," Patent Cooperation Treaty, Jan. 21, 2025, 06 pages, International Application No.-PCT/IB2024/058047.

* cited by examiner

GENERATING EXPANDED CONTENT IN A VIDEO STREAM BASED ON PREDICTING VIEWER BEHAVIOR

BACKGROUND OF THE INVENTION

1. Field of the Invention

The present invention relates to a computer program product, system, and method for generating expanded content in a video stream based on predicting viewer behavior.

2. Description of the Related Art

Generative Adversarial Networks (GANs) have been adapted to generate video content. GANs generate new data that conforms to the distribution of the training data set. GANs have two neural networks, a generator neural network that generates videos and a discriminator neural network that classifies the output of the generator neural network as real or fake, and that classification is fed back into the generator neural network to retrain to reinforce not generating the discriminator classified fake video and reinforce generating the discriminator classified real video. Video GANs can generate videos using text descriptions to generate new scenes and characters. Video GANs can also be used for video synthesis to complete video frames that have been only partially completed to create new video or replace missing frames.

SUMMARY

Provided are a computer program product, system, and method for generating expanded content in a video stream based on predicting viewer behavior. A determination is made of promoted content rendered in the video. In response to determining the promoted content, invoking at least one machine learning model to perform determining whether a viewer of the video is interested in the promoted content and generating expanded content for a duration in response to determining that the viewer of the video is interested in the promoted content. The rendering of the video is paused and the expanded content is rendered for the duration while pausing the rendering of the video. The rendering of the video is continued in response to completing the rendering of the expanded content.

DETAILED DESCRIPTION

Described embodiments provide improvements to computer technology using predictive modeling and historical learning to predict viewer behavior in order to generate expanded content into a video stream during real time presentation of the video stream. Described embodiments provide improvements to technology for expanding video content by determining points in a video stream at which to consider expanding content based on the predictive modeling of behavior of the users. Described embodiments provide a duration model to determine a duration of expanded content based on the context and viewer information and provide that information to generative neural networks to generate expanded content, such as a video clip.

Described embodiments further improve efficiency of computational operations to generate expanded or modified content in a video by initiating the generating of the expanded content for promoted content before the promoted content is rendered, so that the expanded content can be presented immediately after the promoted content is presented to provide the viewer time to interact with promoted content in the video stream through their smartphone.

Described embodiments further provide improved technology for generating expanded content by using machine learning models to predict user interest in promoted content so that the expanded content is presented while the main video stream is paused to provide the viewers time to interact with the promoted content during the duration of the expanded content. Further, the expanded content allows viewers not interested in the promoted content to continue watching the expanded content, which may be an extension of the current scene they were watching, while the original video stream is paused. This improves the human interaction experience with the video for all viewers, including those interested and not interested in the promoted content.

Figures 1, 2:
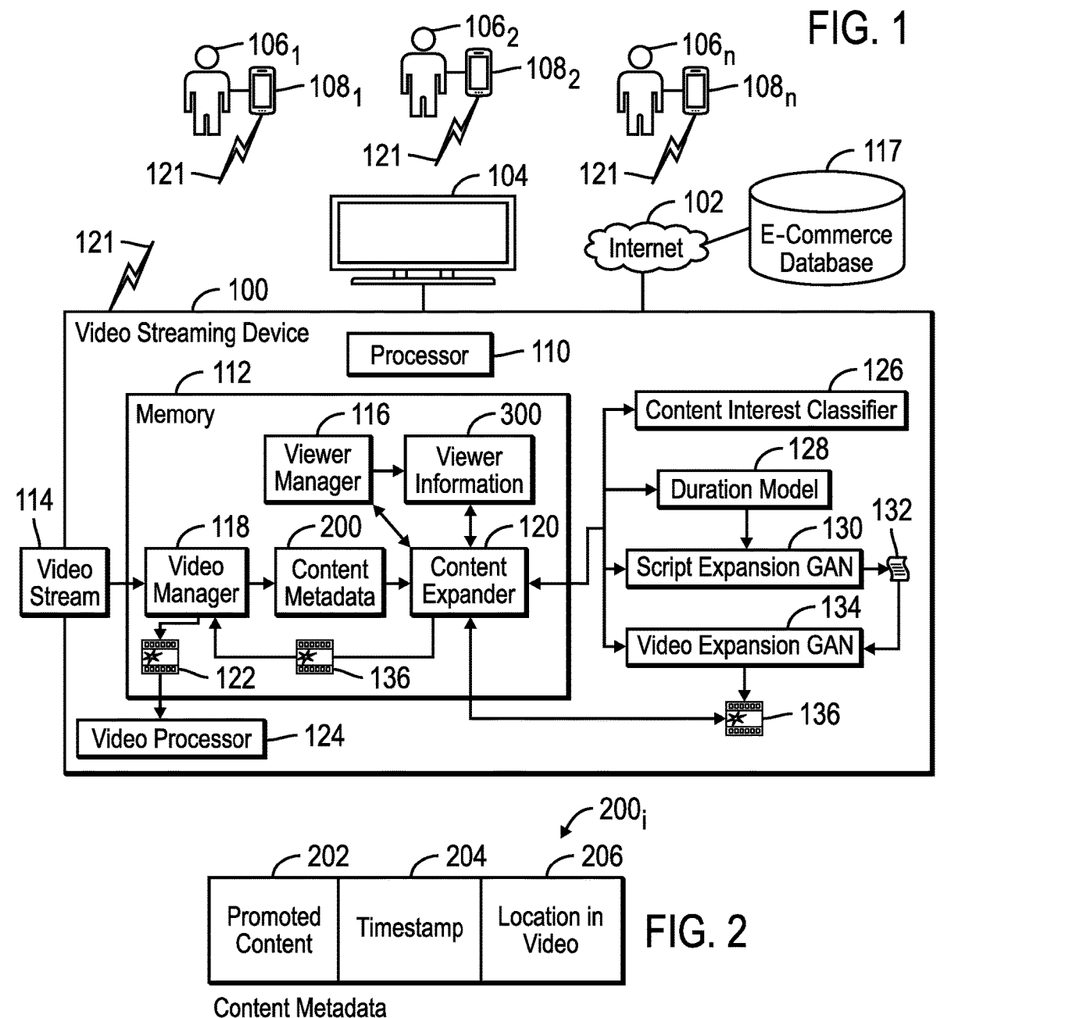
FIG. 1 illustrates an embodiment of a video streaming environment to expand content of a video.
FIG. 2 illustrates an embodiment of an instance of content metadata.

FIG. 1 illustrates an embodiment of a video streaming environment having a video streaming device 100 streaming video content downloaded from over the Internet 102, or another device or network, and streamed to a video screen 104, such as a television, projector, computer monitor, etc., to render content to a viewing audience comprised of one or more viewers $106_1$, $106_2$ ... $106_n$. Each of the viewers $106_1$, $106_2$ ... $106_n$ may have a smartphone $108_1$, $108_2$ ... $108_n$ on their person. The video streaming device 100 includes a processor 110 and a memory 112 including programs to control the streaming of video 114 to the video screen 104. The video streaming device 100 may comprise a standalone digital media player or embedded in a larger product such as a game console or smart television. In still further embodiment, certain components of the video streaming device 100 may be located in the cloud. The memory 112 includes various programs executed by the processor 110, including a viewer manager 116, a video manager 118, and a content expander 120. The viewer manager 116 gathers information on the viewers $106_1$, $106_2$ ... $106_n$ watching the content rendered on the video screen 104. In one embodiment, the viewer manager 116 may communicate via wireless transmission 121, such as Bluetooth®, with nearby smartphones $106_i$ to determine a number of people within a viewing distance of the video screen 104. The viewer manager 116 may collect viewer information 200 from the located viewers $106_i$ and, with permission, access, over the Internet 102, an online databases 117, such as e-commerce shopping databases, to gather information on the viewers $106_i$, such as a history of user interactions with promoted content in the video stream, including purchases, browsing, viewing, etc. (BLUETOOTH is a registered trademark of the Bluetooth Special Interest Group (SIG) throughout the world).

A video stream 114, including both video frames 122 and content metadata 200, is received from over the Internet 102 or other device or network. A video manager 118 processes the video stream 114 to buffer video frames 122 to render on the screen 104 and transmit content metadata 200 on promoted content in the video stream 114 to a content expander 120. The content expander 120 inputs information on the promoted content in the content metadata 200 and viewer information $300_i$ for the viewers $106_i$ to a content interest classifier 126 to output indication whether at least one of the viewers $106_i$ is interested in the promoted content with a confidence level. A duration model 128 determines a duration to generate expanded content if at least one of the viewers is interested. A script expansion generative adversarial network (GAN) 130 generates a script 132 for the expanded content based on a context or scene including the promoted content. In described embodiments, a video expansion GAN 134 generates expanded video 136 from the GAN generated script 132. In further embodiments, there may be expansion GANs 134 to generate other types of expanded content, e.g., audio, images, and other media types.

The expanded video 136 is returned to the content expander 120 to send to the video manager 118 to control sending to the video processor 124 to generate into the rendered video on the video screen 104 while the video 122 from the video stream 114 is paused.

In one embodiment the script expansion GAN 130 and video expansion GAN 134 may comprise generative adversarial networks. The content interest classifier 126 and duration model 128 may comprise machine learning models trained to generate their respective output, such as decision tree learning, association rule learning, neural network, inductive programming logic, support vector machines, Bayesian network, etc. For artificial neural network program implementations of these components, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output, such as a classification whether a user is interested in promoted content and a duration of the expanded content. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as machine learning models 126 and 128, margin of errors are determined based on a difference of the calculated predictions and user rankings of the output. Biases (parameters) at nodes in the hidden layer are adjusted accordingly to minimize the margin of error of the error function.

The GANs 130 and 134 may be trained using script and video discriminators, respectively, to train the generators 130, 134 to produce the correct outputs, scripts 132 and videos 134, respectively. Other types of machine learning models that may be used to generate the script and video include stable diffusion models (SDMs), autoregressive models, variational autoencoders, and convolutional generative adversarial networks (CGANs). In a further embodiment, the operations of the script expansion GAN 130 and video expansion GAN 134 may be implemented in a single GAN neural network or more than two GAN neural networks. Further, the content interest classifier 126 and duration model 128 may be implemented in a single neural network or more than two neural networks.

In an alternative embodiment, the duration of the expanded video may comprise a fixed duration or determined by a rules based model, not determined by a machine learning model.

Generally, program modules, such as the program components 116, 118, and 120, among others, may comprise routines, programs, objects, components, logic, data structures, and so on that perform particular tasks or implement particular abstract data types.

The video processor 124 may be implemented as a hardware component and the machine learning models 126, 128, 130, and 134 may be implemented in Artificial Intelligence hardware accelerators. In alternative embodiments, the video processor 124 and machine learning models 126, 128, 130, and 134 may be implemented as programs in the memory 112.

The program components 116, 118, and 120 may be accessed by a processor from memory to execute. Alternatively, some or all of the program components 116, 118, and 120 may be implemented in separate hardware devices, such as Application Specific Integrated Circuit (ASIC) hardware devices and field programmable gate arrays (FPGAs).

The functions described as performed by the programs 116, 118, and 120 and the machine learning models 126, 128, 130, and 134 may be implemented as program code in fewer program modules and machine learning models than shown or implemented as program code throughout a greater number of program modules and machine learning models than shown.

The smartphones 108i may comprise any personal computing device, such as a tablet, smartphone, laptop, wearable computer, etc. The video streaming device 100 may comprise a standalone digital media player or be embedded in a larger device, such as a smart television or game console.

FIG. 2 illustrates an embodiment of an instance of content metadata $200_i$ comprising promoted content 202 that will appear at a timestamp 204 at a location 206 (frame number and pixel location) in the video frame. The promoted content may provide information on a product, service or product promotion to purchase or a public or private information announcement that is included in the video stream 114 and to be promoted.

Figure 3:
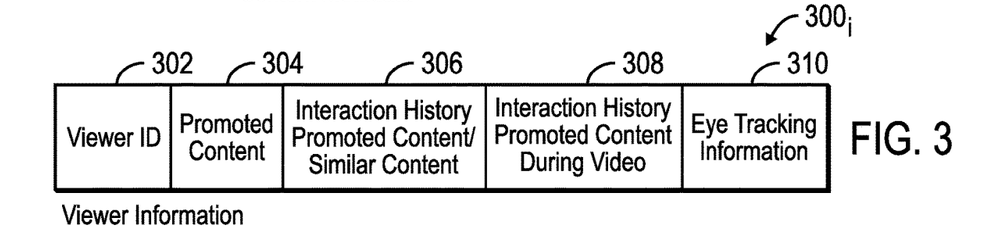
FIG. 3 illustrates an embodiment of viewer information related to an interaction history with respect to content rendered in the video.

FIG. 3 illustrates an embodiment of an instance of the viewer information $300_i$ having information generated for the viewers $106_i$ based on their interactions with the promoted content that will soon be rendered in the video, and includes a viewer ID 302 of the viewer $106_i$; promoted content 304 from the content metadata $200_i$ soon to be rendered in the video; an interaction history 306 of the viewer 302 (e.g., purchase history, number of times information accessed on promoted content, clicks-to-views, etc.) with respect to the promoted content 304 or content similar to the promoted content 304, such as similar products, services or information; an interaction history 308 of the viewer 302 with promoted content in general during video streaming presentations the video streaming device 100; and eye tracking information 310 indicating whether the viewer was gazing at the promoted content 304 when rendered on the screen 104. The eye tracking information 310 may be gathered by gaze tracking glasses worn by the viewer 302 or by a camera mounted on the video screen 104 to capture gaze tracking information from viewers $106_i$.

Figure 4A:
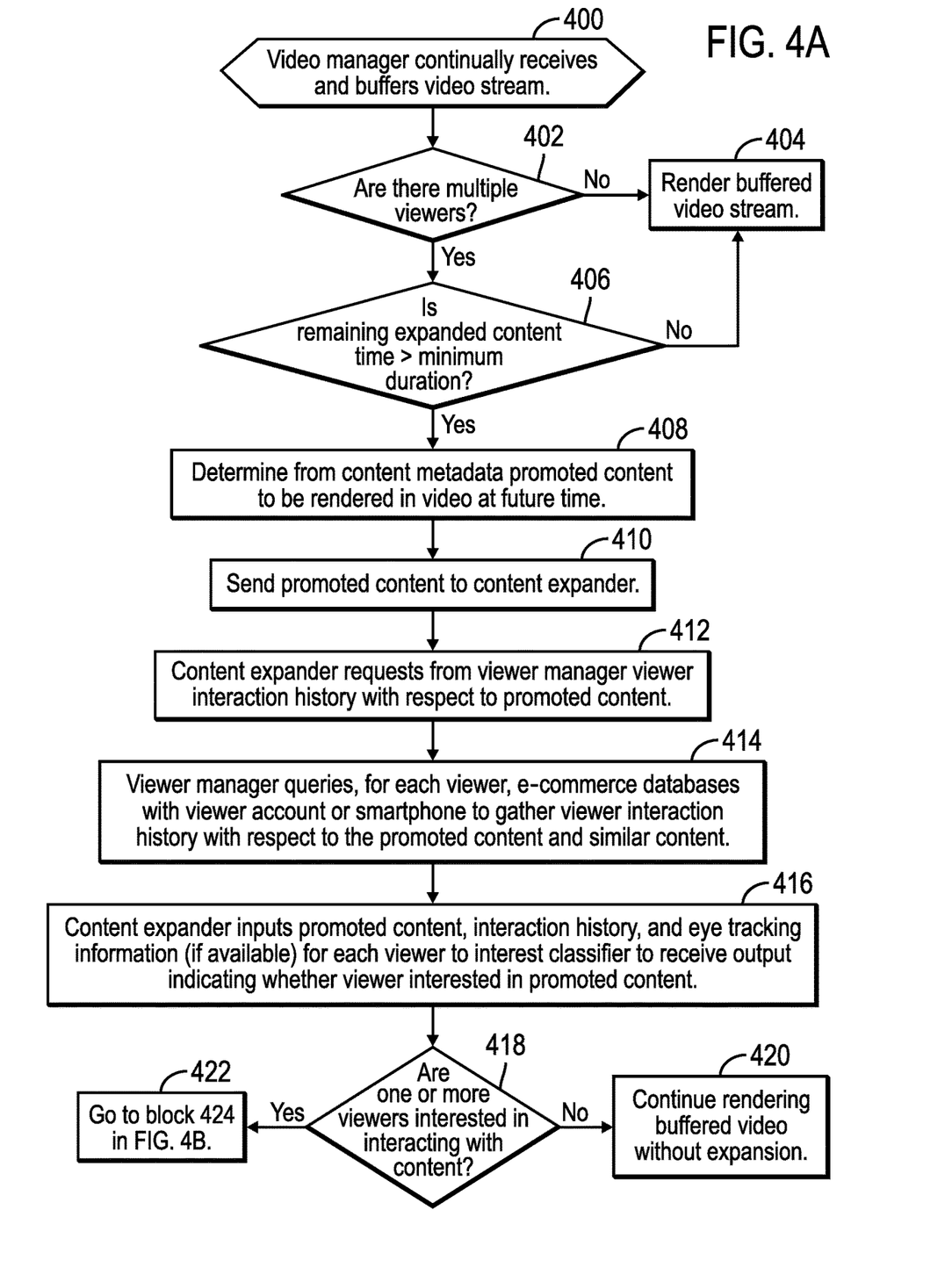
FIGS. 4A and 4B illustrate an embodiment of operations to insert expanded content in a video stream.
Figure 4B:
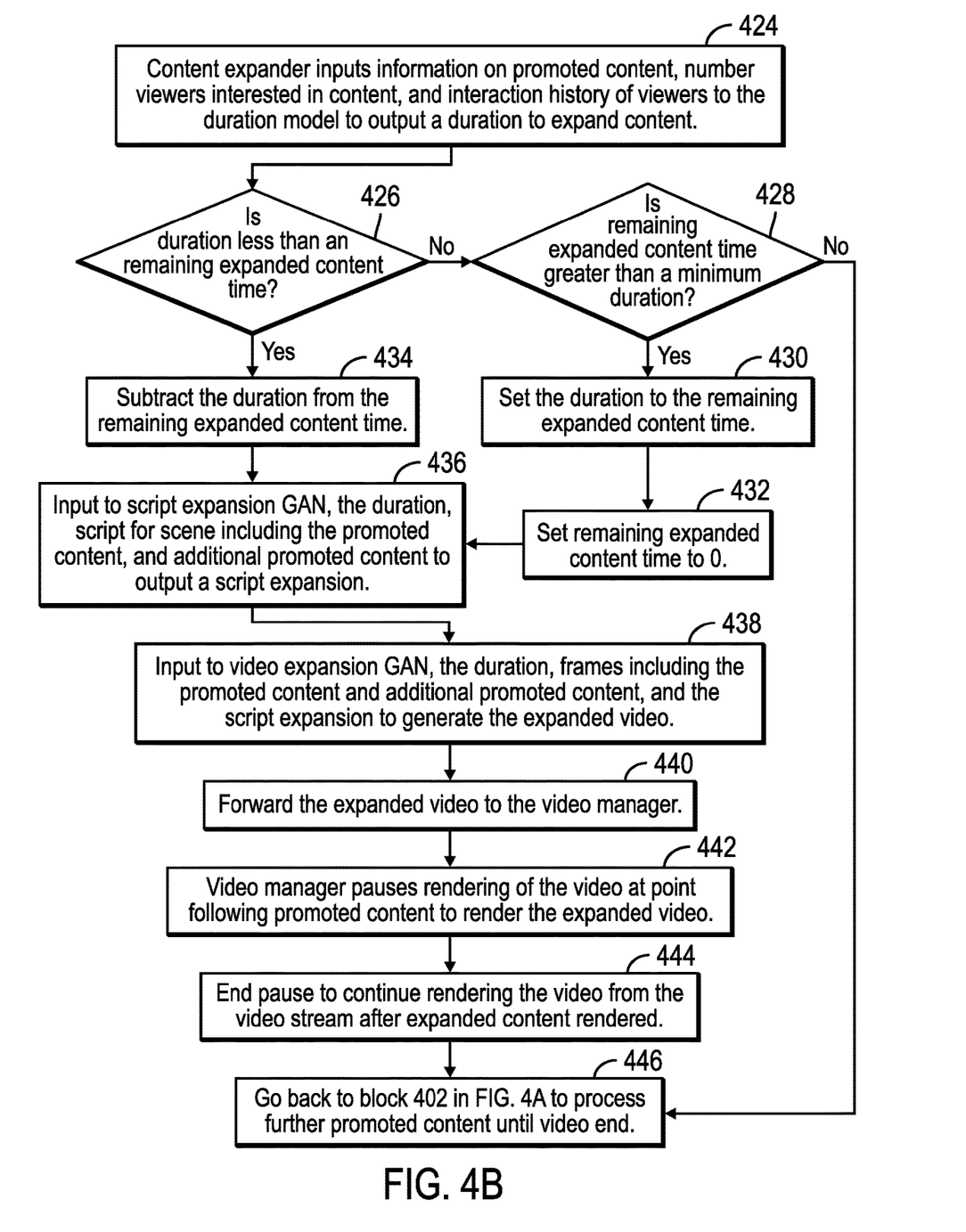

FIGS. 4A and 4B illustrate an embodiment of operations to generate expanded content within the video being streamed to the video screen 104 to provide the viewers 106$_i$ time to interact on their smartphone 108$_i$ with a promoted content that appeared on the screen 104. Upon the video manager 118 receiving and buffering (at block 400) the video stream 114, having both video 122 and content metadata 300, a determination is made (at block 402) whether there is only one viewer 106$_1$. If so, then the video manager 118 sends the video 122 with the promoted content to the video processor 124 to render (at block 404) on the screen 104. If (at block 402) there are multiple viewers 106$_i$ and if (at block 406) a remaining expanded content time, set to an initial amount of total time to be consumed by expanded content during the course of the video, is less than a minimum duration, then there is no remaining time for expanded content and control proceeds to block 404 render the video 122 having the promoted content. The remaining expanded content time is used to provide a limit on the amount of expanded content presented during the video presentation to improve the viewer experience.

If (at block 406) the remaining expanded content time is greater than a minimum duration for expanded content, then the video manager 118 determines (at block 408), from content metadata 200$_i$, the promoted content 202 to be rendered in the video 122 at a future time and sends (at block 410) the promoted content 202 to the content expander 120. The content expander 120 requests (at block 412) from the viewer manager 116 the viewer interaction history 300$_i$ with respect to the promoted content 202. The viewer manager 116 queries, for each viewer 106$_i$, (at block 414) e-commerce databases 117 with authorized viewer account information or queries viewer smartphone 108$_i$ to gather viewer interaction history 306 with respect to the promoted content and similar content, including purchases and viewing time spent browsing the promoted content and viewer interaction history 308 with promoted content during video presentations.

The content expander 120 inputs (at block 416) promoted content 202, interaction history 300$_i$, and eye tracking information (if available) for each viewer 106$_i$ to content interest classifier 126 to receive output indicating whether each viewer 106$_i$ is interested in the promoted content 202. If gaze tracking information is inputted, it may be gathered after the promoted content 202 is rendered on the screen 104 followed by operations at blocks 418 et seq. to determine whether to expand content shortly after the promoted content 202 is rendered to provide time for the viewers 106$_i$ to access information on the promoted content 202. If (at block 418) no viewers 106$_i$ are determined as likely interested in interacting with the promoted content 202 on their smartphone 108$_i$, then the video manager 118 continues rendering (at block 420) buffered video 122 without content expansion. If (at block 418) viewers 106$_i$ are interested, then control proceeds (at block 422) to block 424 in FIG. 4B.

At block 424 in FIG. 4B, the content expander 120 inputs information on the promoted content 202, number of viewers 106$_i$ classified as interested, by the content interest classifier 126, and interaction history 300$_i$ of viewers 106$_i$ with respect to the promoted content 202, to the duration model 128 to output a duration to expand content. If (at block 426) the duration is greater than a remaining expanded content time, comprising a maximum time during rendering the video that expanded content may be shown, and, if (at block 428) the remaining expanded content time is greater than a minimum duration, i.e., minimum time to bother generating expanded content, then the duration is set (at block 430) to the remaining expanded content time and the remaining expanded content time is set (at block 432) to zero. If (at block 426) the duration is less than the remaining expanded content time, then the duration is subtracted (at block 434) from the remaining expanded content time.

After setting the duration from block 432 or 436, the content expander 120 inputs to the script expansion GAN 130 information comprising the duration and script for the scene including the promoted content to have the script expansion GAN 130 output a script expansion 132 having a script for the duration of the expanded content. The content expander 120 then inputs (at block 438) to the video expansion GAN 134, the duration, frames having the scene from the video 122, including the promoted content, and supplemental promoted content to include in the expanded video 136. Supplemental promoted content may comprise additional products and services to promote and public service announcements that are not necessarily in the video stream 122, but are intended to be promoted during the presentation of the expanded video 136. For instance, producers may contract with the video streaming service offering the video streaming device 100 and to have their advertisements displayed during the expanded video 136. Further, the expanded video 136 may comprise a continuation of the current scene in which the promoted content was rendered by inputting frames of the scene in the video 122 including the promoted content to the video expansion GAN 134 to generate frames comprising an extension of the context and plot of the current scene. Providing expanded content that is a continuation or expansion of the current scene allows other viewers not interested in the promoted content to continue viewing content similar to what they were previously viewing so they can continue with their experience by viewing a continuance of the current scene while interested viewers use the time to obtain further information or purchase the promoted content 202. In a further embodiment, the expanded content 136 may comprise a different scene, such as in the case of an advertisement.

The content expander 120 forwards (at block 440) the expanded video 136 to the video manager 118. The video manager 118 pauses (at block 442) the rendering of the video 122 at a point following the presentation of the promoted content 202 to render the expanded video 136. The pause of the buffered video is ended (at block 444) to continue rendering video 122 from the video stream 114 after the expanded video 136 has been rendered. After restarting the video 122 after the pause (from block 444) or if the remaining expanded content is less than a minimum duration (from block 428), control proceeds (at block 446) to block 402 in FIG. 4A to continue determining whether to render expanded content in the video stream 114.

With the embodiment of FIGS. 4A and 4B, if promoted content 202 is about to be presented in the video stream 114 that is indicated in content metadata 200$_i$, then a determination is made whether to pause the video 122 and generate and render expanded video 136 to allow viewers 106$_i$ an opportunity to interact with and gather information on the promoted content 202. Described embodiments provide improved technology using generative neural networks to generate the video expansion 136 to immediately insert expanded content into a video stream to enhance the ability of the video streamers to provide targeted information to viewers, such as targeted advertising or public service announcements.

In a further embodiment, if the viewer manager 116 receives information that all interested viewers 106$_i$, as determined by the content interest classifier 126, have completed interacting with the promoted content 202, such as completed purchase of a product or service presented in the promoted content 202, then the viewer manager 116 may control the video manager 118 to end the pause and continue with the rendering of the video 122.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
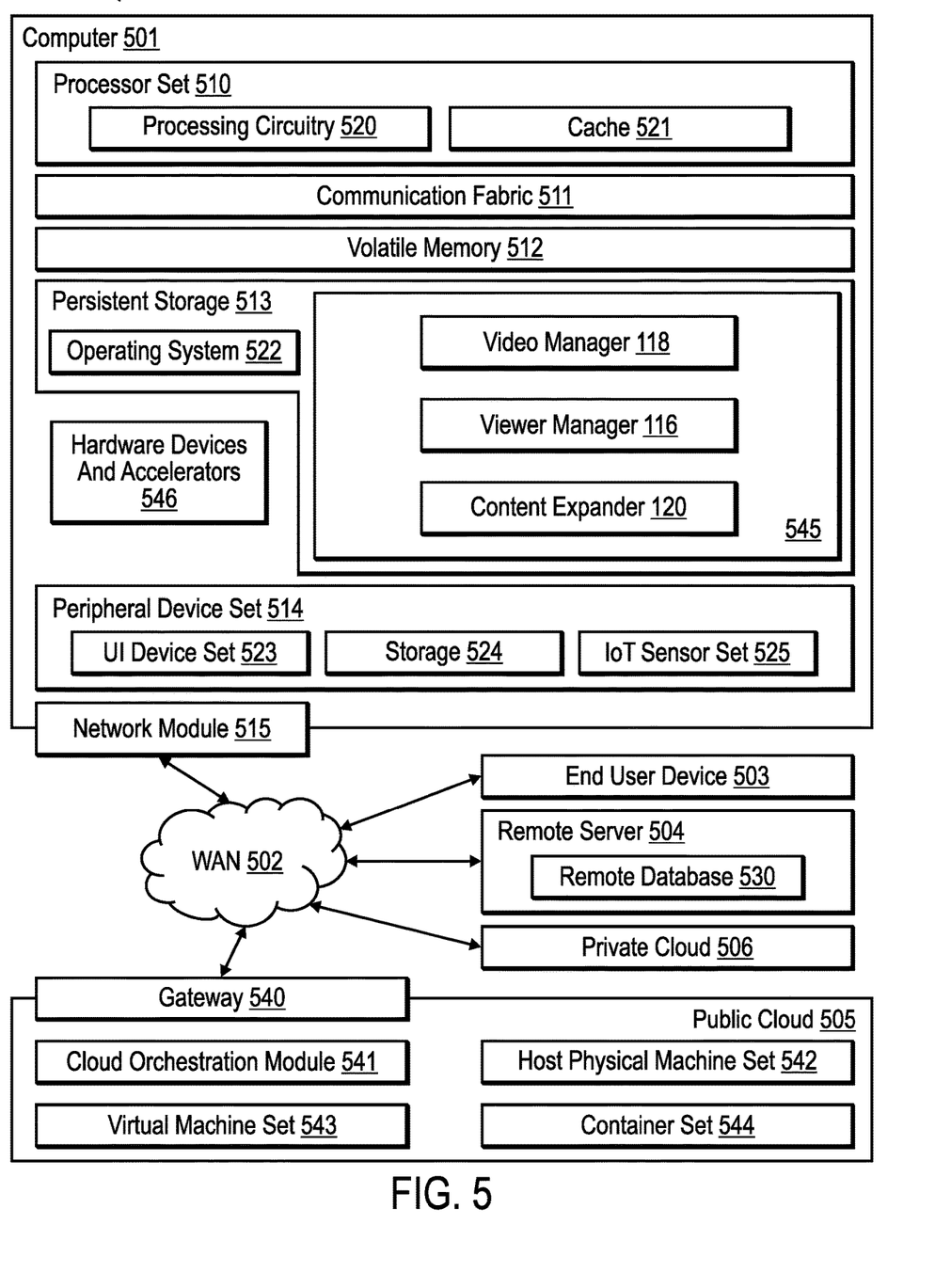
FIG. 5 illustrates a computing environment in which the components of FIG. 1 may be implemented.

With respect to FIG. 5, computing environment 500 contains an example of an environment for the execution of at least some of the computer code involved in performing the inventive methods, such as the components in block 545 comprising the viewer manager 116, video manager 118, and content expander 120 that cooperates with hardware devices and accelerators 546, including the machine learning models 126, 128, 130, and 134, to generate expanded content to insert into a video stream, as described above with respect to the figures. In addition to blocks 545 and 546, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and blocks 545 and 546, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated. The computer 501 may comprise a video streaming device 100 as described above with respect to the figures.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 545 and 546 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in blocks 545 and 546 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on. The EUDs 503 may comprise the viewer smartphones $108_i$, as described above with respect to the figures.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504. The remote database 530 may comprise the e-commerce database 117, as described above with respect to the figures.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for expanding media content in a video during rendering of the video, the computer program product comprising a computer readable storage medium having computer readable program code embodied therein that is executable to perform operations, the operations comprising:
   determining promoted content rendered in the video;
   in response to determining the promoted content, invoking at least one machine learning model to perform:
      determining whether a viewer of the video is interested in the promoted content; and
      generating expanded content comprising a continuation of a scene in the video including the promoted content that was being viewed for a duration in response to determining that the viewer of the video is interested in the promoted content;
   pausing the rendering of the video;
   rendering the expanded content for the duration while pausing the rendering of the video; and
   continuing the rendering of the video in response to completing the rendering of the expanded content.

2. The computer program product of claim 1, wherein the at least one machine learning model further determines the duration to render expanded content in response to determining that the viewer of the video is interested in the promoted content.

3. The computer program product of claim 1, wherein the operations further comprise:
   determining whether the duration exceeds a remaining expanded content time, wherein the generating the expanded content is performed in response to determining that the duration is less than the remaining expanded content time,
   wherein the duration is set to the remaining expanded content time in response to the remaining expanded content time is greater than a minimum content time and less than the duration; and
   decrementing the remaining expanded content time by the duration in response to determining that the duration is less than the remaining expanded content time.

4. The computer program product of claim 1, wherein the determining whether the viewer of the video is interested in the promoted content comprises:
   inputting, into a machine learning model classifier, information on an interaction history of the viewer with respect to the promoted content or content similar to the promoted content prior to the rendering of the video including the promoted content, wherein output from the machine learning model classifier indicates whether the viewer observing the promoted content is likely interested in further interacting with the promoted content.

5. The computer program product of claim 4, wherein the promoted content represents a product or service, wherein the interaction history of the viewer with respect to the promoted content comprises a purchase history with respect to the promoted content and browsing history with respect to the promoted content, wherein the operations further comprise:
   accessing, from an account of the viewer at an e-commerce web site, the purchase history and the browsing history with respect to the promoted content to provide to the machine learning model classifier.

6. The computer program product of claim 1, wherein the operations further comprise:
   inputting, into a first machine learning model classifier, information on at least one viewer observing the video including the promoted content and the promoted content to output indication whether the at least one viewer of the video is likely interested in further interaction with the promoted content; and
   inputting into a second machine learning model information on the at least one viewer and the promoted content to output the duration to render the expanded content in response to the first machine learning model classifier outputting indication that the at least one viewer of the video is likely interested in further interaction with the promoted content.

7. The computer program product of claim 1, wherein the generating the expanded content comprises:
   processing information on a context of the video including the promoted content to generate expanded content in the context of video.

8. The computer program product of claim 1, wherein the generating the expanded content comprises:
   receiving, by a generative adversarial neural network, input comprising frames of the video including a scene in which the promoted content appears.

9. The computer program product of claim 8, wherein the input, received by the generative adversarial neural network, further includes information on supplemental promoted content to include in the expanded content, wherein the expanded content includes rendering of the supplemental promoted content.

10. The computer program product of claim 1, wherein the generating the expanded content comprises:
    receiving, by a first generative adversarial network, input comprising a script of content of the video including the promoted content to generate expanded content script for the duration; and
    inputting, to a second generative adversarial network, the expanded content script to generate expanded content comprising video to render while the video is paused.

11. The computer program product of claim 1, wherein the operations further comprise:
    determining that the viewer has completed interacting with the promoted content before the expanded content has completed rendering for the duration; and
    ending the pausing to continue rendering the video from where paused in response to determining that the viewer has completed interacting with the promoted content.

12. A system for expanding media content in a video during rendering of the video, comprising:
    a processor; and
    a computer readable storage medium having computer readable program code embodied therein that when executed by the processor performs operations, the operations comprising:
        determining promoted content rendered in the video;
        in response to determining the promoted content, invoking at least one machine learning model to perform:
            determining whether a viewer of the video is interested in the promoted content; and
            generating expanded content comprising a continuation of a scene in the video including the promoted content that was being viewed for a duration in response to determining that the viewer of the video is interested in the promoted content;
        pausing the rendering of the video;
        rendering the expanded content for the duration while pausing the rendering of the video; and
        continuing the rendering of the video in response to completing the rendering of the expanded content.

13. The system of claim 12, wherein the determining whether the viewer of the video is interested in the promoted content comprises:
    inputting, into a machine learning model classifier, information on an interaction history of the at viewer with respect to the promoted content or content similar to the promoted content prior to the rendering of the video including the promoted content, wherein output from the machine learning model classifier indicates whether the viewer observing the promoted content is likely interested in further interacting with the promoted content.

14. The system of claim 12, wherein the operations performed in response to executing the computer readable program code further comprise:
    inputting, into a first machine learning model classifier, information on at least one viewer observing the video including the promoted content and the promoted content to output indication whether the at least one viewer of the video is likely interested in further interaction with the promoted content; and inputting into a second machine learning model information on the at least one viewer and the promoted content to output the duration to render the expanded content in response to the first machine learning model classifier outputting indication that the at least one viewer of the video is likely interested in further interaction with the promoted content.

15. The system of claim 12, wherein the generating the expanded content comprises:

processing information on a context of the video including the promoted content to generate expanded content in the context of video.

16. The system of claim 12, wherein the generating the expanded content comprises:

receiving, by a generative adversarial neural network, input comprising frames of the video including a scene in which the promoted content appears.

17. A method for expanding media content in a video during rendering of the video, comprising:

determining promoted content rendered in the video;

in response to determining the promoted content, invoking at least one machine learning model to perform:

determining whether a viewer of the video is interested in the promoted content; and generating expanded content comprising a continuation of a scene in the video including the promoted content that was being viewed for a duration in response to determining that the viewer of the video is interested in the promoted content;

pausing the rendering of the video;

rendering the expanded content for the duration while pausing the rendering of the video; and continuing the rendering of the video in response to completing the rendering of the expanded content.

18. The method of claim 17, wherein the determining whether the viewer of the video is interested in the promoted content comprises:

inputting, into a machine learning model classifier, information on an interaction history of the viewer with respect to the promoted content or content similar to the promoted content prior to the rendering of the video including the promoted content, wherein output from the machine learning model classifier indicates whether the viewer observing the promoted content is likely interested in further interacting with the promoted content.

19. The method of claim 17, wherein the operations further comprise:

inputting, into a first machine learning model classifier, information on at least one viewer observing the video including the promoted content and the promoted content to output indication whether the at least one viewer of the video is likely interested in further interaction with the promoted content; and inputting into a second machine learning model information on the at least one viewer and the promoted content to output the duration to render the expanded content in response to the first machine learning model classifier outputting indication that the at least one viewer of the video is likely interested in further interaction with the promoted content.

20. The method of claim 17, wherein the generating the expanded content comprises:

processing information on a context of the video including the promoted content to generate expanded content in the context of video.

* * * * *